United States Patent
Sauvage et al.

(10) Patent No.: US 7,370,095 B2
(45) Date of Patent: May 6, 2008

(54) PROVIDING AN EXECUTABLE SOFTWARE ELEMENT AND CONTROL VALUE FOR CONTROLLING THE EXECUTABLE SOFTWARE ELEMENT TO A USER AGENT

(75) Inventors: Alexis Sauvage, Rousies (FR); Stephen Minnis, Wreningham (GB)

(73) Assignee: British Telecommunications public limited company, London (GB)

( * ) Notice: Subject to any disclaimer, the term of this patent is extended or adjusted under 35 U.S.C. 154(b) by 869 days.

(21) Appl. No.: 10/471,829

(22) PCT Filed: Mar. 14, 2002

(86) PCT No.: PCT/GB02/01458

§ 371 (c)(1),
(2), (4) Date: Sep. 15, 2003

(87) PCT Pub. No.: WO02/079980

PCT Pub. Date: Oct. 10, 2002

(65) Prior Publication Data

US 2004/0098669 A1 May 20, 2004

(30) Foreign Application Priority Data

Mar. 30, 2001 (GB) .................... 0108059.7

(51) Int. Cl.
*G06F 15/177* (2006.01)
*G06F 15/16* (2006.01)

(52) U.S. Cl. .................. 709/220; 709/203; 713/1; 715/513

(58) Field of Classification Search ........ 709/218–228, 709/200–203; 713/1; 715/513
See application file for complete search history.

(56) References Cited

U.S. PATENT DOCUMENTS

| 6,031,830 A | 2/2000 | Cowan |
| 6,181,713 B1 | 1/2001 | Patki et al. |

FOREIGN PATENT DOCUMENTS

| EP | 0818 742 A1 | 1/1998 |
| GB | 2348987 A | 10/2000 |
| WO | WO 00/65851 | 11/2000 |
| WO | WO 00/68828 | 11/2000 |

OTHER PUBLICATIONS

Farjami et al, "Advanced Service Provisioning Based on Mobile Agents", Computer Communications, Elsevier Science Publishers BV, Amsterdam, NL, vol. 23, No. 8, Apr. 2000, pp. 754-760, XP004192595.

Vitali t al, "Extending HTML in a Principled Way with Displets", Computer Networks and ISDN Systems, North Holland Publishing, Amsterdam, NL, vol. 29, No. 8-13, Sep. 1, 1997,m pp. 1115-1128, XP004095309.

*Primary Examiner*—Haresh Patel
(74) *Attorney, Agent, or Firm*—Nixon & Vanderhye P.C.

(57) ABSTRACT

Applets can obtain parameters from the HTML of the pages in which they are embedded. These parameters are created dynamically in dependence on the capabilities of, and/or other constraints relating to, the user agent (1, 2) requesting an applet-containing page. In this way, suitably written applets can adapt themselves to their environment.

14 Claims, 5 Drawing Sheets

```
<!DOCTYPE html PUBLIC "-//W3C//DTD HTML 4.0 Transitional//EN"
"http://www.w3.org/TR/REC-html40/loose.dtd">
<html>
        <title>The Game</title>
        ...
</html>

<body>
<h1>The Game</h1>
...

<!--##APPLETHEADER##-->
<param name="someparam" value="somevalue">
<!##APPLETPARAMS-->
</applet>

...

</body>
</html>
```

Figure 5

```
<!DOCTYPE html PUBLIC "-//W3C//DTD HTML 4.0 Transitional//EN"
"http://www.w3.org/TR/REC-html40/loose.dtd">
<html>
        <title>The Game</title>
        ...
</html>

<body>
<h1>The Game</h1>
...

<applet code="codesource.GameApplet archive="gameapplet.jar"
width="100" height="100">
<param name="someparam" value="somevalue">
<param name="user" value="Joe Bloggs">
<param name="ColourCapable" value="Yes">
<param name="ScreenSizeText" value="10x10">
</applet>

...

</body>
</html>
```

Figure 6

PROVIDING AN EXECUTABLE SOFTWARE ELEMENT AND CONTROL VALUE FOR CONTROLLING THE EXECUTABLE SOFTWARE ELEMENT TO A USER AGENT

This application is the US national phase of international application PCT/GB02/01458 filed 14 Mar. 2002 which designated the U.S.

BACKGROUND

1. Technical Field

The present invention relates to providing an executable software element to a user agent.

2. Description of Related Art

Mobile Station Application Execution Environment (MExE) is a wireless protocol that is designed to be incorporated into user agents such as smart mobile phones. MEXE's aim is to provide a comprehensive and standardized environment on mobile phones for executing operator or service provider specific applications.

MExE classmarks 2 an 3 are designed as complete application execution environments, using a Java Virtual Machine in the user agent.

The MExE standards define a framework for client/server applications, and define the protocols and language used in client/server negotiation. Each MExE terminal is defined by a set of parameters (e.g. screen size, whether applets are supported or not). These parameters can be organized in different sets (e.g. hardware and software) and are described using the Resource Description Framework (RDF) standard developed by W3C (the World Wide Web Consortium). RDF is based on XML and is used as metadata (i.e. data about data). RDF defines the framework to describe the information, and the syntax is specified by the WAP User Agent Profile (a set of parameters initially designed for WAP terminals).

The RDF files must be provided by the manufacturer, OS/browser vendor, and be stored on the network side. For example, for each release of a new SomeElectronics Co. terminal, the company creates a new hardware RDF file that conveys the information about the new product and is then stored on the network (e.g. on a server operated by the company).

The user can also customize the user agent, simply by using a GUI which can be controlled by the user. The user's preferences can then stored either on the terminal itself or on the network side.

In order for the information provided by the RDF files to be used, a negotiation protocol needs to be used. The MExE specification recommends the CC/PP (Composite Capabilities/Preference Profile) protocol as the negotiation protocol. CC/PP is an exchange protocol using the HTTP extension framework (RFC2774), and therefore is directly included in the HTTP requests/responses.

Basically, this protocol defines where to find the RDF files using a reference mechanism but may directly include some RDF files in its own fields. A CC/PP enabled server retrieves the RDF files from the network side (by issuing requests to the CC/PP repositories), and is then able to process all the information.

However, the standards do not outline any specific implementation strategy. It is therefore an aim of the present invention to provide such a strategy.

BRIEF DESCRIPTION OF NON-LIMITING EXEMPLARY EMBODIMENTS

According to the present invention, there is provided a method of providing an executable software element to a user agent, the method comprising:

receiving a request for a resource from a user agent, the request including a first identifier related to the request source and a second identifier identifying a document including an executable software element;

responding to said request by determining an appropriate control value for controlling said executable software element in dependence on said first identifier and sending said document to the request source, wherein the document as sent includes said control value in a manner for automatically controlling said executable software element.

The executable software element may comprise an applet, for example a Java applet. However, the invention can be employed with other technologies such as ActiveX.

The control value may comprise an attribute of an HTML applet or object tag. A further control value for controlling said executable software element in dependence on said first identifier may be determined and includes in an HTML applet parameter tag.

The control value may comprise an attribute of an HTML applet parameter tag.

The first identifier comprises a set of one or more resource locators, e.g. URIs. Preferably, a user agent profile is requested and received in dependence on a user agent profile resource locator comprised in said identifier. Preferably, a user preference definition is requested and received in dependence on a user preferences resource locator comprised in said first identifier. More preferably, the profiles and/or preferences are combined to produce a combined profile. The form of the combined profile is not important as long data required for such a profile is available. Still more preferably, a method according to the present invention includes determining whether a plurality of profiles and/or preferences have values for the same parameter and, if so, including only the least resource intensive in the combined profile. Yet more preferably, a method according to the present invention comprises comparing the combined profile with a resource requirement profile for said executable software element and said document is sent on condition that the combined profile does not conflict with the resource requirement profile.

According to the present invention, there is also provided a server configured to perform a method according to the present invention.

BRIEF DESCRIPTION OF THE DRAWINGS

An embodiment of the present invention will now be described, by way of example, with reference to the accompanying drawings, in which:

FIG. 5 illustrates a resource; and

FIG. 6 illustrates a document produced from the resource of FIG. 5 using the method illustrated in FIG. 4.

DETAILED DESCRIPTION OF NON-LIMITING EXEMPLARY EMBODIMENTS

Figure 1:
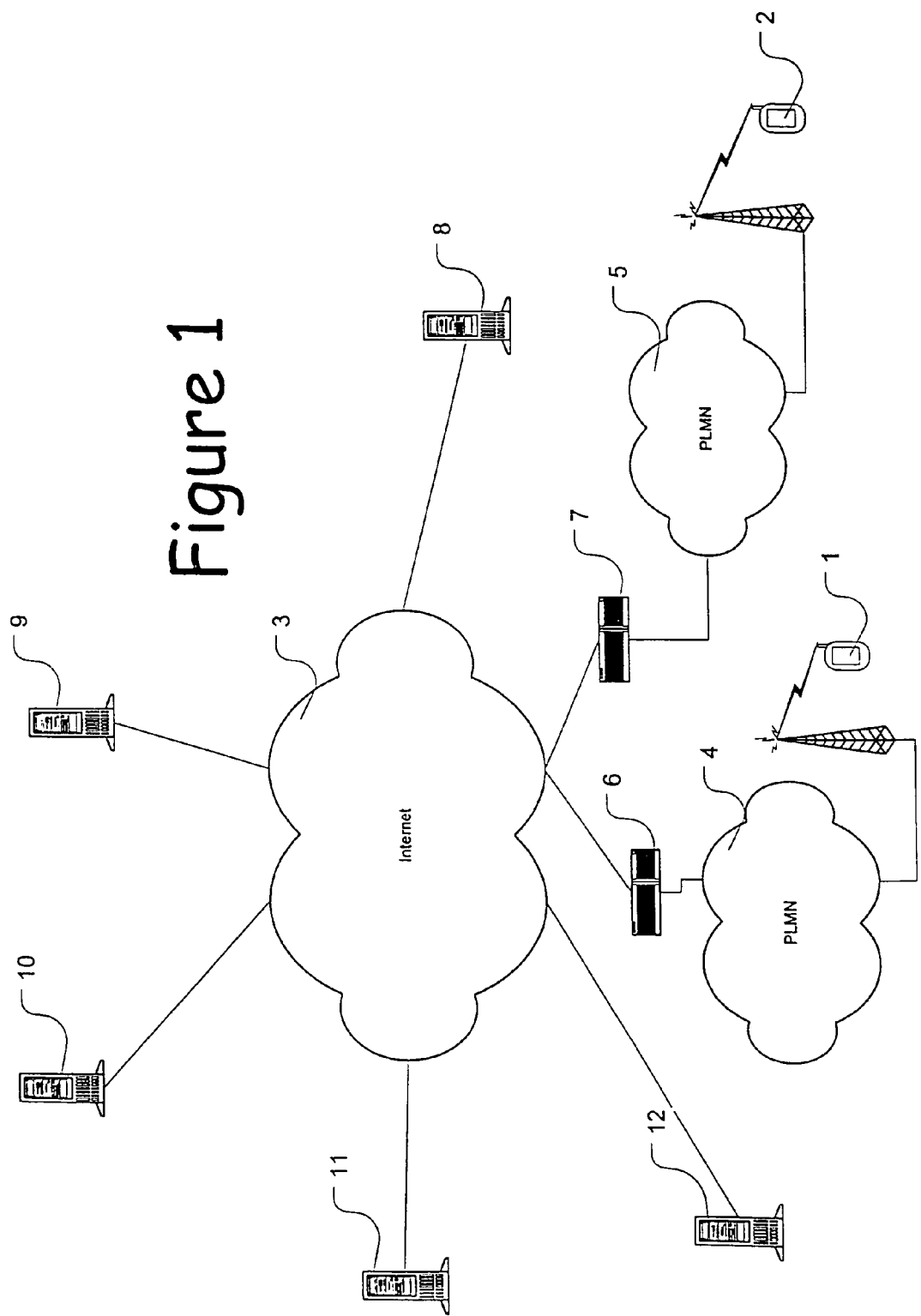
FIG. 1 illustrates the application of the present invention in a wireless network.

Referring to FIG. 1; a plurality of user agents 1, 2 may connect wirelessly to the Internet 3 via respective mobile phone networks 4, 5. The user agents 1, 2, may be, for example, smartphones or personal digital assistants used in combination with a mobile phone and conform to MExE classmark 2 or higher. The mobile phone networks 4, 5 are connected to the Internet 3 by respective gateways 6, 7.

An application server 8, first and second user agent profile servers 9, 10, and first and second user preference servers 11, 12 are also connected to the Internet 3.

The first user agent profile server 9 is operated by the manufacturer of the first user agent 1 and uses a web server program to provide user agent software and hardware profiles as RDF files in response to requests therefor. The second user agent profile server 10 is similarly arranged and can provide user agent software and hardware profile RDF files for the second user agent 2 in response to a request therefor.

The first user preferences server 11 is operated by the service provider of the user of the first user agent 1 and stores RDF files defining user preferences for display parameters, e.g. colour or monochrome, large fonts. The first user preferences server 11 uses a web server program to provide user preference RDF files to allowed hosts, e.g. servers run by trusted application service providers. The second user preferences server 12 is similarly configured but provides user preference data for users, including the user of the second user agent 2, registered with another service provider.

Figure 2:
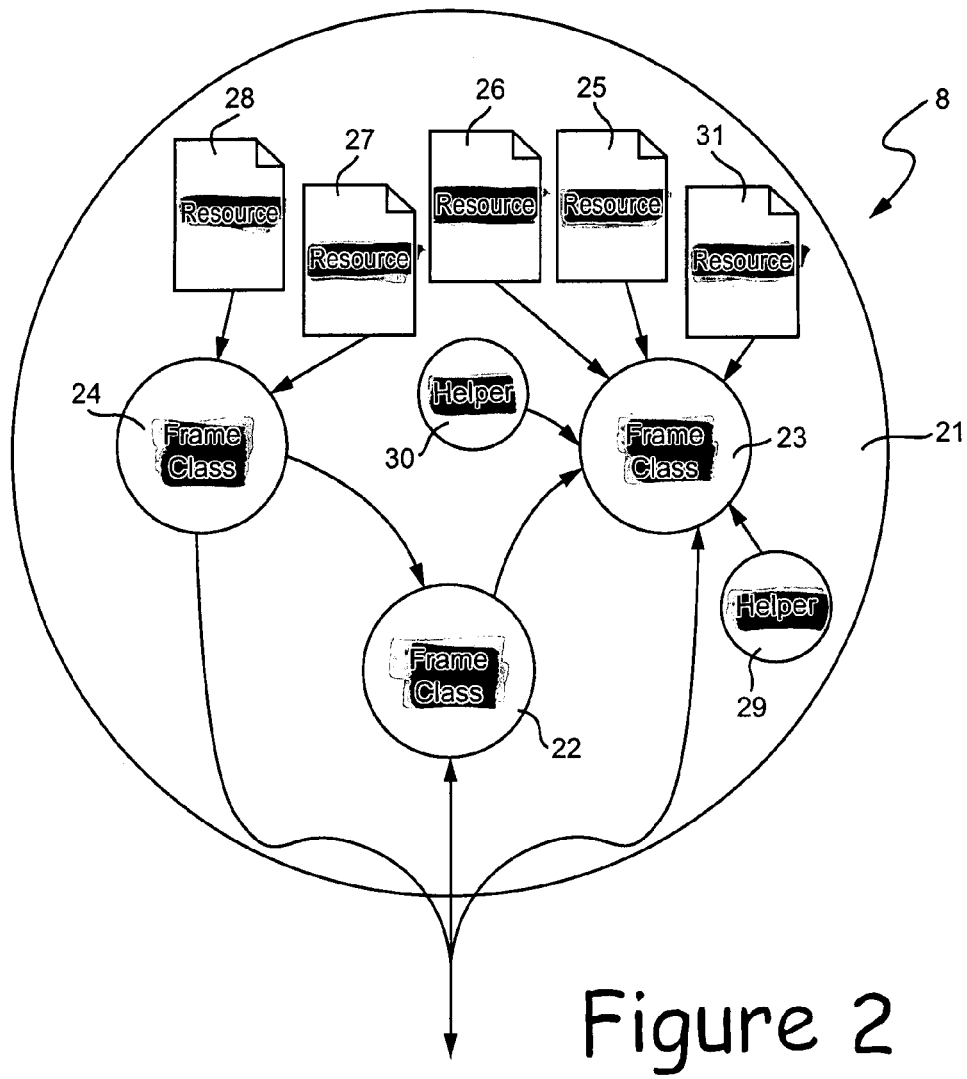
FIG. 2 is a dataflow diagram for a server implementing an embodiment of the present invention.

Referring to FIG. 2, the application server 8 is implemented using a Jigsaw web server 21. The Jigsaw web server is available from W3C. The Jigsaw web server uses indexer objects 22 to direct HTTP requests to objects of the appropriate frame class 23, 24 which process the HTTP requests to produce HTTP responses. Each frame class has associated with it a respective set of resources 25, 26, 27, 28, 31.

In the present example, a user will request a page containing a Java applet. This involves a user agent first requesting the page and then requesting the Java applet in response to the contents of a an applet tag in the HTML of the page. Objects 23 of a page frame class handle requests for a category of pages 25, 26 that include configurable applets. The page frame class objects 23 are substantially generic with the logic peculiar to particular applications, e.g. a particular game, being provided by helper components 29, 30. The helper components 29, 30 present the same interface and can be add without the need to modify the first frame class. A second frame class 24 handles requests for applet code.

Figure 3:
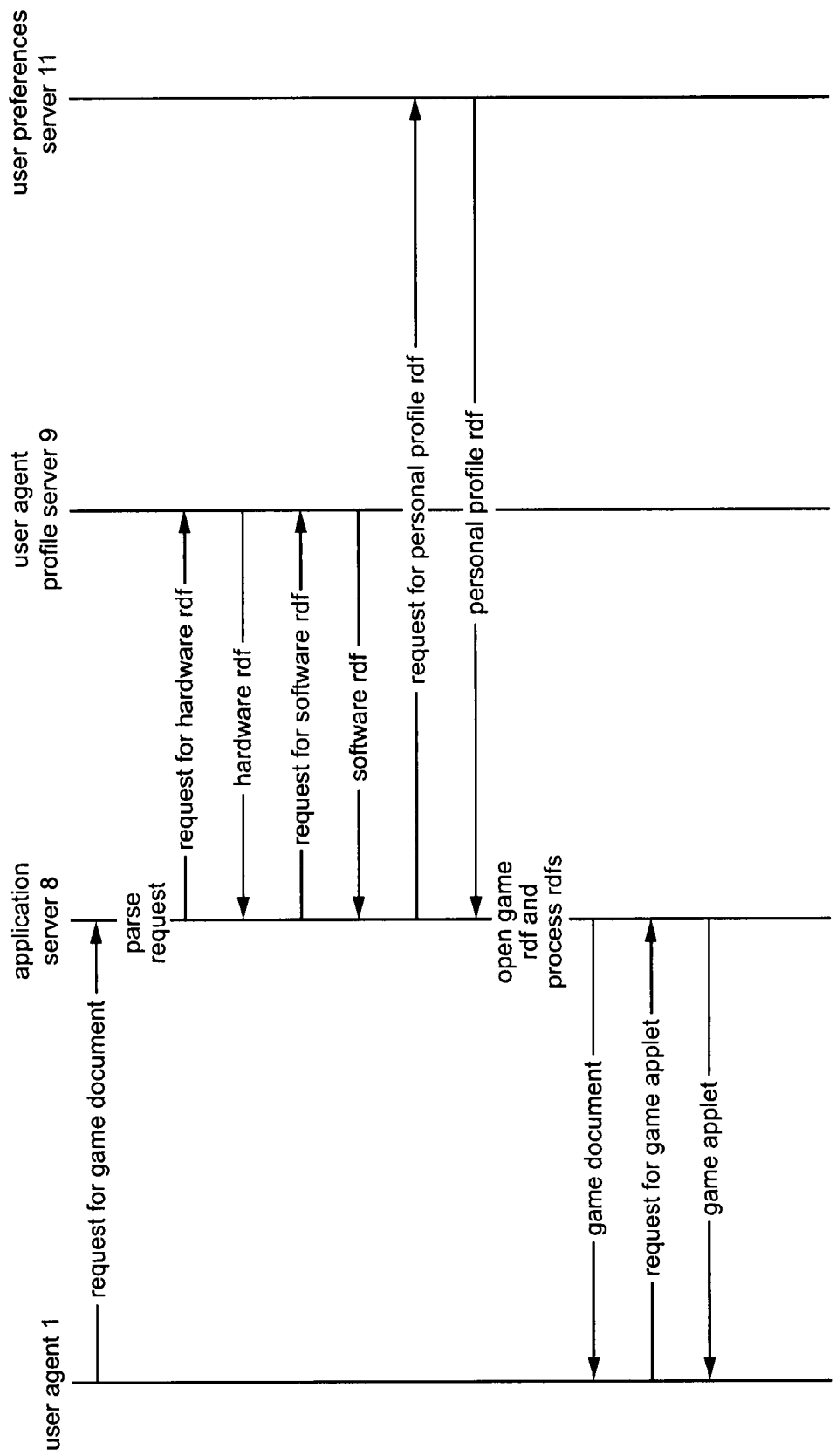
FIG. 3 is a signalling diagram illustrating an embodiment of the present invention.

Referring now to FIG. 3, the user of the first user agent 1 decides to play an applet-implemented game. The user therefore activates a browser on the first user agent 1 and enters the URI of the game's page. This causes the first user agent 1 to send a request for the game's page to the application server 8. This request comprises requested document's URI, the URI of a CC/PP exchange mandatory extension declaration and the URIs of the user agent and user preferences RDF files. The inclusion of the URI of a CC/PP exchange mandatory extension declaration and the URIs of the user agent and user preferences RDF files is an extension of conventional browser behaviour and requires the browser to obtain the URIs from a memory within the user agent and insert them into HTTP requests.

This request is received by the application server 8 and is passed to a page frame object 23. The page frame object 23 parses the request and extracts the user agent profile URIs and the user preferences URI. The page frame object 23 then sends requests for the user agent software and hardware profiles to the server specified in the URIs therefor. In this case, the specified server is the first user agent profile server 9. The page frame object 23 also sends a request for the user's preferences to the server specified in the user preferences URI in the request. When the user agent and personal preferences RDF files have been received, the page frame object 23 opens a local RDF file 29 which defines the game's user agent minimum resource requirements. The RDF file data is stored in hash table format.

In the present example, each of the user agent profiles and the game resource requirements are expressed using the same xml namespace, e.g. http://www.wapforums.org/UA-PROF/ccppschema-19991014. A common xml namespace for user preferences also is desirable.

Figure 4:
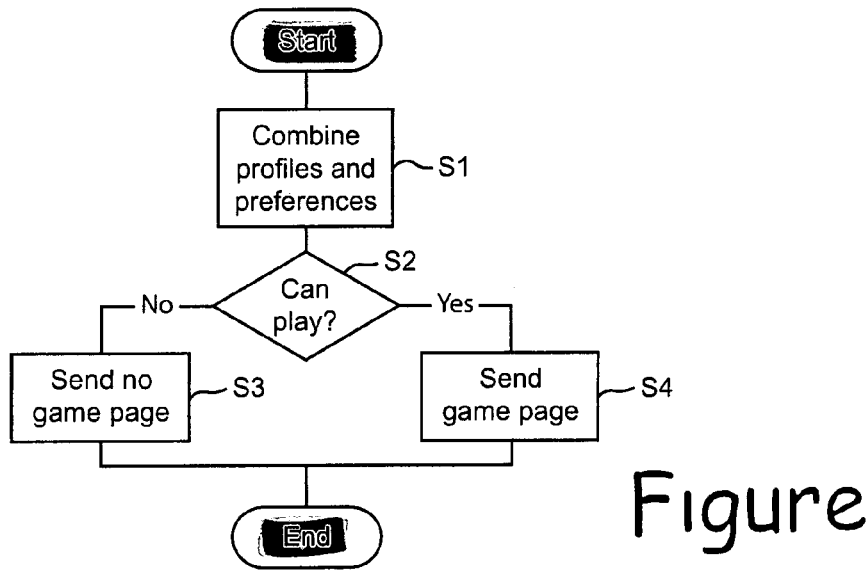
FIG. 4 is a flowchart illustrating the generation of a document in an embodiment of the present invention.

Referring to FIG. 4, having obtained the profile and preferences data, the game frame object 23 combines them by selecting the value for each element represented which is least demanding from the perspective of the user agent (step s1). For example, if the user agent hardware profile specifies that the device is colour capable but the user's preferences specify not colour capable, the combined profile specifies "not colour capable". Of course, if a parameter is represented in only once, the single instance will be selected.

The combined profile is then compared with the minimum resource requirements of the game (step s2). If the minimum resource requirements of the game are exceeded by the combined profile in any respect, it is determined that the game cannot run on the user agent 1 and the page frame object 23 sends a page to the user agent which informs the user that the game cannot be played on the first user agent 1 (step s3). Otherwise the page frame object 23 instantiates an instance 29 of the appropriate helper component, passing the combined profile to the helper component's constructor. The helper component instance 29 then processed the combined profile to generate applet tags from the game document to be sent to the first user agent 1 (step s4).

Referring to FIG. 5, the resource 25 for the game includes placeholders similar to those used for server side includes (SSI).

Applets cannot be sized using values in parameter tags, instead the size of an applet when displayed is set using height and width attributes of the applet tag itself. Consequently, the helper component instance 29 constructs an applet tag with height and width attribute values set in dependence on the ScreenSize element of the combined profile. For instance, the applet may need to be displayed square. In this case, the width and height attribute values may be set at the lesser of the width and height values of the ScreenSize element.

Additional control parameters, e.g. a user name provided from the user preferences, the colour capability of the user agent and the screen size in characters, are built into a series of HTML applet parameter tags. The values of the parameters in these tags can be accessed by the applet which will have been programmed to respond to them to adjust its user interface and/or other aspects of its operation according to its environment.

As the resource 25 is dispatched to the first user agent 1, the helper component instance 29 replaces the placeholders with the newly generated applet and parameter tags so that the data transmitted to the user agent is as illustrated in FIG. 6.

When the first user agent 1 receives the dispatched resource 25, it responds to the applet tag by sending a request to the application server 8 for the applet's code. An indexer object 22 passes the request to an applet frame object 24 which then dispatches the relevant jar file 27 to the first user agent 1.

A request from the second user agent 2 for the game document is similarly handled except that the hardware and software profile requests are sent to the second user agent profile server 10 and the personal preferences request is sent to the second personal preferences server 12 respectively.

In the above-described system, a new applet implemented application is created by creating a jar file containing the applet code;
creating HTML resources for the pages to be sent when the applet can run and when it cannot run;
creating a class file containing the code for the helper component for the new applet; and
install these files in appropriate placed on the application server 8.

It will be understood that the present invention is not restricted to the above-described scenario and that additional sources of information, useful for customizing applet behaviour, e.g. parental content control rules, subscription level access control rules and user agent geographical location related rules, may be employed to provide additional RDF data for building the combined profile.

What is claimed is:

1. A server for providing an executable software element including an applet to a user agent, the server comprising:
    a receiver for receiving a request for a resource from a user agent, the request including a first identifier related to the request source and a second identifier identifying a document including an executable software element, wherein said first identifier comprises a set of resource locators;
    a processing system which responds to said request received by the receiver by:
        requesting profiles and/or preferences based on respective resource locators;
        receiving and combining the requested profiles and/or preferences to produce a combined profile;
        determining whether a plurality of profiles and/or preferences have values for a same parameter and, if so, including only a least resource intensive in the combined profile;
        determining a control value based on said first identifier for controlling said executable software element and based on the combined profile; and
        sending the document to the request source, the document as sent including said control value in a manner for automatically controlling said executable software element.

2. The server according to claim 1, wherein said control value comprises an attribute of an HTML applet tag.

3. The server according to claim 2, wherein the processing system determines a further control value for controlling said executable software element based on said first identifier, wherein said document as sent includes said further control value in an HTML applet parameter tag.

4. The server according to claim 2, wherein said control value comprises an attribute of an HTML applet parameter tag.

5. The server according to claim 1, wherein said requested and received profiles are user agent profiles determined based on a user agent profile resource locator included as at least one of the resource locators of said first identifier.

6. The server according to claim 1, including said requested and received user preferences are user agent preferences determined based on a user agent resource locator included as a least one of the resource locators in said first identifier.

7. The server according to claim 1, wherein the processing system compares the combined profile with a resource requirement profile for said executable software element and said document is sent on condition that the combined profile does not conflict with the resource requirement profile.

8. A method of providing an executable software element including an applet to a user agent, the method comprising:
    receiving a request for a resource from the user agent, the request including a first identifier related to the request source and a second identifier identifying a document including an executable software element, wherein said first identifier comprises a set of resource locators;
    responding to said request by:
        requesting profiles and/or preferences based on respective resource locators;
        receiving and combining the requested profiles and/or preferences to produce a combined profile;
        determining whether a plurality of profiles and/or preferences have values for a same parameter and, if so, including only a least resource intensive in the combined profile;
        determining a control value based on said first identifier for controlling said executable software element and based on the combined profile; and
        sending the document to the request source, the document as sent including said control value in a manner for automatically controlling said executable software element.

9. The method according to claim 8, wherein said control value comprises an attribute of an HTML applet tag.

10. The method according to claim 9, further comprising determining a further control value for controlling said executable software element based on said first identifier, wherein said document as sent includes said further control value in an HTML applet parameter tag.

11. The method according to claim 9, wherein said control value comprises an attribute of an HTML applet parameter tag.

12. The method according to claim 8, wherein said requested and received profiles are user agent profiles determined based on a user agent profile resource locator included as at least one of the resource locators of said first identifier.

13. The method according to claim 8, including said requested and received user preferences are user agent preferences determined based on a user agent resource locator included as a least one of the resource locators in said first identifier.

14. The method according to claim 8, comprising comparing the combined profile with a resource requirement profile for said executable software element and said document is sent on condition that the combined profile does not conflict with the resource requirement profile.

* * * * *